United States Patent [19]

Furuya

[11] Patent Number: 5,234,768
[45] Date of Patent: Aug. 10, 1993

[54] GAS PERMEABLE MEMBER

[75] Inventor: Nagakazu Furuya, Yamanashi, Japan

[73] Assignees: Tanaka Kikinzoku Kogyo K.K.; Nagakazu Furuya, Japan

[21] Appl. No.: 491,092

[22] Filed: Mar. 9, 1990

[30] Foreign Application Priority Data

Feb. 10, 1988 [JP] Japan .................... 63-29932
Jul. 4, 1988 [JP] Japan .................... 63-166537

[51] Int. Cl.$^5$ .................... B32B 9/00; C25B 11/03
[52] U.S. Cl. .................... 428/408; 428/421; 428/422; 428/689; 204/72
[58] Field of Search ............. 428/408, 421, 422, 689

[56] References Cited

U.S. PATENT DOCUMENTS 4,794,043 12/1988 Kaji et al. .................... 428/408
4,898,766 2/1990 Tamamura et al. .................... 428/421
4,931,168 6/1990 Watanabe et al. .................... 204/284

OTHER PUBLICATIONS

*Chemistry Letters,* "Electrochemical Reduction of Carbon Monoxide to Hydrocarbons at Various Metal Electrodes in Aqueous Solution", Hori, et al., pp. 1665–1668, 1987.

*Primary Examiner*—P. C. Sluby
*Attorney, Agent, or Firm*—Klauber & Jackson

[57] ABSTRACT

Disclosed herein is a gas permeable member, in particular a gas permeable electrode, carrying a metal complex on a reaction layer thereof. A central metal of the complex may be selected from lead, chromium, iron, cobalt, nickel, copper, zinc, platinum, palladium, manganese, tin, vanadium or the like. The selectivity of a reaction employing the gas permeable member depends on the central metal so that the gas permeable member can be employed in a wide range of applications including electrolytic reduction of carbon dioxide by suitably selecting the central metal of the complex.

The complex, for instance a Pc-complex, may be deposited from sulfuric acid by diluting the sulfuric acid by water to be uniformly dispersed in the reaction layer.

4 Claims, 1 Drawing Sheet

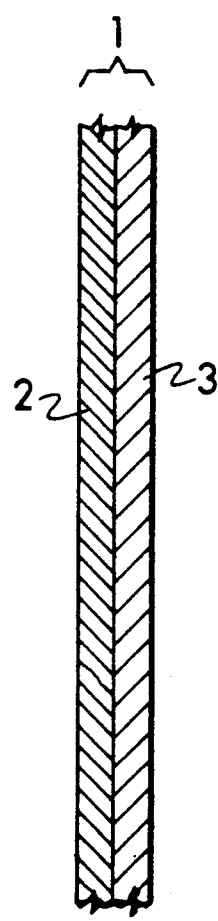

GAS PERMEABLE MEMBER

BACKGROUND OF THE INVENTION

1. Field of the Invention

The present invention relates to a gas permeable member, in particular a gas permeable electrode including a reaction layer carrying a complex thereon as an oxidation reduction catalyst, and a method for producing the gas permeable member.

2. Description of the Background Art

Research of a new use of a phthalocyanine and complexes thereof, hereinafter referred to as a "Pc-complex" or "Pc-complexes" in the light of the catalytic characteristics has been developed. However, principal Pc-complexes are not dissolved in an organic solvent and are stable against not only an alkali but also a dilute acid. Hence, it is difficult to find a proper method for carrying the Pc-complex on a carrier. One popular Pc-complex carrying method usually used is as follows. That is, Pc-complex powder is mixed with carbon powder and the like used as a substrate for a reactive layer of a gas permeable member or electrode to obtain a powdery mixture, and the obtained powdery mixture is placed on a gas permeable layer of a sheet form and is processed into a certain form by a hot press under conditions such as at 360° C. and 600 kg/cm$^2$ to obtain a gas permeable electrode.

In this case, the Pc-complex is dispersed in the whole reaction layer, and an extremely large amount of the Pc-complex to be used is required to invite a high cost. Also, in this case, since the Pc-complex is dispersed in the form of powder, the surface area of the obtained reaction layer is small.

Meanwhile, in conventional electrolytic reduction of carbon dioxide for producing carbon monoxide and an organic compound, electrolytic reduction of an aqueous solution containing a bicarbonate or the like is effected, while carbon dioxide is blown into the solution, to obtain an organic compound such as formic acid, methane, ethane or the like. In this case, a usual electrode such as a copper, cadmium or lead plate is used for an electrolytic reduction electrode (cathode), and thus the current density is small. Hence, the producing efficiency of the organic compound is low, and the productivity becomes low.

SUMMARY OF THE INVENTION

Accordingly, it is an object of the present invention to provide a gas permeable member, especially a gas permeable electrode, free from the aforementioned defects and disadvantages of the prior art, which is capable of improving efficiency of a reaction layer and ability of catalytic characteristics, increasing surface area of the reaction layer and reducing a used amount of Pc-complex carried on the reaction layer.

It is another object of the present invention to provide a method for producing a gas permeable member, free from the aforementioned defects and disadvantages of the prior art, which is capable of improving efficiency of a reaction layer and ability of catalytic characteristics, increasing surface area of the reaction layer and reducing a used amount of Pc-complex carried on the reaction layer.

In accordance with one aspect of the present invention, there is provided a gas permeable member, comprising a reaction layer having fine hydrophilic and hydrophobic portions and carrying a complex recrystalized from sulfuric acid, on the hydrophilic portions, and a gas permeable layer bonded to the reaction layer, having fine hydrophobic portions therein.

In accordance with another aspect of the present invention, there is provided a method for producing a gas permeable member including a reaction layer and a gas permeable layer, comprising the steps of contacting a concentrated sulfuric acid solution containing a complex having solubility in sulfuric acid and recrystallizability by water with the reaction layer, and feeding the water through the gas permeable member to crystallize the complex on the reaction layer.

In accordance with still another aspect of the present invention, there is provided an electrolytic reduction method for producing an organic compound by using a gas permeable electrode as an electrolytic reduction electrode, mounted in an electrolytic cell containing KHCO$_3$ solution therein, the gas permeable electrode including a reaction layer having fine hydrophilic and hydrophobic portions and carrying a metal complex on the hydrophilic portions, and a gas permeable layer bonded to the reaction layer, having fine hydrophobic portions therein, in which carbon dioxide gas is fed to the gas permeable layer to pass through the gas permeable electrode to obtain carbon dioxide and an organic compound at the electrolytic reduction electrode.

BRIEF DESCRIPTION OF THE DRAWING

These and other objects, features and advantages of the present invention will more fully appear from the following description of the preferred embodiments.

A FIGURE is a longitudinal cross section of a gas permeable electrode according to the present invention.

DESCRIPTION OF THE PREFERRED EMBODIMENTS

Referring now to the drawing, there is shown in the FIGURE one embodiment of a gas permeable electrode according to the present invention.

In the FIGURE, the gas permeable electrode 1 comprises a reaction layer 2 and a gas permeable layer 3 bonded thereto. The gas permeable electrode 1 can be applied to an anode and/or a cathode.

In this case, the reaction layer of the gas permeable electrode may be prepared as follows. That is, 4 to 8 parts by weight of hydrophilic carbon black, 2 to 8 parts by weight of hydrophobic carbon black and 2 to 4 parts by weight of polytetrafluoroethylene (PTFE) powder are uniformly mixed with one another, and then solvent naphtha as a solvent is also uniformly mixed with the mixture. Then, the obtained mixture is processed under pressure into a certain form and is then heated at 280° C. to remove the solvent, thereby obtaining the reaction layer.

The gas permeable layer of the gas permeable electrode may be prepared by using 2 to 8 parts by weight of hydrophobic carbon black and 2 to 8 parts by weight of PTFE in the same manner as the reaction layer described above.

The average particle size of the hydrophilic and hydrophobic carbon blacks is approximately 400 to 500 Å, and the average particle size of the PTFE is approximately 0.1 to 0.5 μm.

Then, the obtained reaction layer having a thickness of approximately 0.05 to 0.2 mm and the gas permeable layer having a thickness of approximately 0.3 to 1.0 mm are bonded to each other, and the bonded two layers are processed under pressure into a predetermined shape to obtain a gas permeable electrode.

Then, the Pc-complex is carried on the reaction layer of the gas permeable electrode by using a concentrated sulfuric acid solution containing the Pc-complex in some manners, as follows. That is, it can be done by immersing the reaction layer of the gas permeable electrode with the sulfuric acid solution, by spraying the sulfuric acid solution to the reaction layer of the gas permeable electrode, or by contacting the sulfuric acid solution with the reaction layer of the gas permeable electrode under pressure or while sucking from the gas permeable layer side.

When the reaction layer of the gas permeable electrode is filled up with the concentrated sulfuric acid solution containing the Pc-complex and steam is fed to the gas permeable electrode from the gas permeable layer side, the Pc-complex is crystallized on the reaction layer. That is, when the steam is fed to the gas permeable electrode from the gas permeable layer, the steam contacts with the concentrated sulfuric acid solution to dilute the concentrated sulfuric acid solution, and hence the Pc-complex cannot dissolve as before in the dilute sulfuric acid solution, i.e., the Pc-complex cannot help crystallizing on the reaction layer of the gas permeable electrode.

As to the Pc-complexes which can be dissolved in the sulfuric acid and be recrystallized by the water so as to be carried on the reaction layer of the gas permeable electrode, phthalocyanine, diphthalocyanine, metal phthalocyanine complexes having a central metal such as lead (Pb), chromium (Cr), iron (Fe), cobalt (Co), nickel (Ni), copper (Cu), zinc (Zn), platinum (Pt), palladium (Pd), manganese (Mn), tin (Sn) or vanadium (V), or the like, can be used.

When the acid is entirely removed from the gas permeable electrode, it is firstly dried at the room temperature and then is preferably heated at approximately 320° to 400° C. In this instance, the sublimation of the Pc-complex can occur at over 400° C., and the acid remaining in the gas permeable electrode after washing thereof cannot be completely decomposed at below 320° C.

In this embodiment, the amount of the Pc-complex to be carried on the reaction layer of the gas permeable electrode can be freely adjusted by controlling the concentration of the Pc-complex in the concentrated sulfuric acid solution and the amount of the steam to be supplied to the gas permeable electrode from the gas permeable layer side.

In the thus obtained gas permeable electrode according to the present invention, the Pc-complex is carried on the hydrophilic carbon black dispersed in the reaction layer, and hence the Pc-complex is carried on the gas-liquid interface in the gas permeable electrode to largely improve its efficiency and ability.

The other gas permeable members in addition to the said gas permeable electrode thus obtained can be used for a variety of applications in many fields. For instance, when a central metal of a Pc-complex is cobalt (Co) or nickel (Ni), a gas permeable electrode can be used as an oxidation reduction electrode for effecting reduction of carbon dioxide, producing hydrogen peroxide or for a sensor. When a central metal of a Pc-complex is iron (Fe), a gas permeable member having a film form can be used as a deodorant.

When the gas permeable electrode of the present invention is used for electrolytic reduction of carbon dioxide, the electrolyte solution permeates into the metal complex as the catalyst of the hydrophilic portions of the reaction layer, and the carbon dioxide actively permeates and spreads into the hydrophobic portions of the reaction layer to contact with the electrolyte solution. Thus, the reduction of the carbon dioxide is actively effected on the catalyst to obtain carbon monoxide and an organic compound with high efficiency, thereby improving the productivity. Further, a large number of metal complexes can be used, and the selectivity or the control of the obtained products can be largely improved by varying the central metal of the metal complex. Further, the current density of the obtained compound can become extremely high and the product amount of the organic compound per the electrode surface area can be extremely large as compared with those of the conventional method.

According to the present invention, for instance, when the Pc-complex carried on the gas permeable electrode includes a central metal of a transition metal such as Co, Ni or Fe, oxygen atom is taken from $CO_2$ adsorbed on the gas permeable electrode to produce CO, and When the Pc-complex carried on the gas permeable electrode includes a central metal of a base metal such as Zn, hydrogen is added to $CO_2$ adsorbed on the gas permeable electrode to produce formic acid. Also, when the Pc-complex carried on the gas permeable electrode includes a central metal such as Cu, the reduction is effected to disconnect oxygen from $CO_2$ adsorbed on the gas permeable electrode and to produce methane at the end.

Also, by utilizing the above described features, the gas permeable member of the present invention can be used for an ozone decomposition, an air cleaning apparatus, a deodorizer of a refrigerator, a drying machine, a dehumidifier, a humidifier and a mixture gas producing apparatus.

As described above, according to the present invention, the Pc-complex as the catalyst can be carried on only the gas-liquid interface in the reaction layer of the gas permeable member without reducing or losing the functions of the gas permeable member, and the efficiency and ability of the Pc-complex carried on the reaction layer can be largely improved. Also, the amount of the Pc-complex to be carried on the reaction layer of the gas permeable member can be largely saved and be readily adjusted. In addition to the use for the electrode, the gas permeable member of the present invention can be also used in the form of film carrying a Pc-complex thereon for a wide variety of applications such as a deodorant or the like. Hence, the present invention can contribute to development of a wide field of technology.

Examples of the present invention will now be described along with Comparative Examples, but it is not intended to restrict the present invention to the Examples.

EXAMPLE 1

7 parts by weight of hydrophilic carbon black, 3 parts by weight of hydrophobic carbon black and 4 parts by weight of PTFE powder were uniformly mixed with one another, and then solvent naphtha as a solvent was also uniformly mixed to the mixture. Then, the obtained mixture was processed under pressure into a certain form and was then heated at 280° C. to remove the solvent, thereby obtaining a reaction layer of a gas permeable electrode.

6 parts by weight of hydrophobic carbon black and 4 parts by weight of PTFE were uniformly mixed with each other, and then the solvent naphtha was also uniformly mixed to the mixture. Then, the obtained mixture was processed under pressure into a certain form and was then heated at 280° C. to remove the solvent, thereby obtaining a gas permeable layer of the gas permeable electrode.

The average particle size of the hydrophilic and hydrophobic carbon blacks was approximately 420 Å, and the average particle size of the PTFE was approximately 0.3 μm.

The obtained reaction layer having a thickness of approximately 0.1 mm and the gas permeable layer having a thickness of approximately 0.5 mm were bonded to each other, and the bonded layers were processed under pressure into a predetermined shape to obtain 6 pieces of gas permeable electrodes having a dimension of 100 mm × 100 mm.

6 Pc-complexes whose central metals were Co, Ni, Fe, Pb, Zn and Cu, were dissolved into concentrated sulfuric acid solution at the concentration of 20 g/l to obtain 6 Pc-complex sulfuric acid solutions. Each Pc-complex sulfuric acid solution was contacted with the reaction layer of each gas permeable electrode, and the water solution was contacted with the gas permeable layer of the same. After leaving each gas permeable electrode as it was for 5 hours, each gas permeable electrode was taken out of the Pc-complex sulfuric acid solution and the water solution. Then, the gas permeable electrodes were washed with a washing liquid such as water and were then dried.

The amounts of the Pc-complex contained in the Pc-complex sulfuric acid solution before and after the Pc-complex carrying treatment and the amount of the Pc-complex contained in washing liquid washing the gas permeable electrode taken out of the Pc-complex sulfuric acid solution were analyzed, and then the amount of the Pc-complex carried on the gas permeable electrode was calculated from these analyzed amounts of the Pc-complex to obtain 40 to 50 mg.

Comparative Example 1

7 parts by weight of hydrophilic carbon black, 3 parts by weight of hydrophobic carbon black and 4 parts by weight of PTFE powder were uniformly mixed to obtain powdery mixture, and then the obtained powdery mixture and Pc-complex powder were mixed at a mixing ratio of 3:7 to obtain a reaction layer powdery mixture. The obtained reaction layer powdery mixture was placed on a gas permeable layer of a sheet form and was processed by a hot press at a temperature of 360° C. and a pressure of 600 kg/cm² to obtain a gas permeable electrode carrying the Pc-complex thereon in a conventional manner. In this case, a Pc-complex having a central metal of Co or Ni was carried on each gas permeable electrode, and the amount of each Pc-complex carried was 800 mg.

Comparative Example 2

By using the two gas permeable electrodes carrying the Pc-complex having the central metal of Co or Ni, prepared in Example 1, and the two gas permeable electrodes carrying the Pc-complex having the central metal of Co or Ni thereon, prepared in Comparative Example 1, as an anode and a gas permeable electrode carrying Pt thereon as a cathode, the anode and cathode were mounted in each electrolytic cell at a distance of 10 mm therebetween, the electrolytic cell containing 0.5M of $KHCO_3$ solution saturated by $CO_2$. A constant-current electrolysis was effected while $CO_2$ gas was supplied to the rear surface of the anode at a constant flowing amount and $H_2$ gas was supplied to the rear surface of the cathode.

The production gas discharged from the rear surface of the anode were analyzed by using a gas chromatography to find that CO was produced with approximately 100% of current efficiency in all cases.

EXAMPLE 2

The electrolysis was effected under the same conditions as those of Comparative Example 2, except using the gas permeable electrode carrying the Pc-complex having the central metal of Cu, prepared in Example 1, as the anode, methane, CO and formic acid were produced in the production gas with respective approximately 30%, 14% and 4% of current efficiency.

EXAMPLE 3

The electrolysis was effected under the same conditions as those of Comparative Example 2, except using the gas permeable electrodes carrying the Pc-complex having the central metal of V or Mn, prepared in Example 1, as the anode, $H_2$ was produced in the production gas with approximately 100% of current efficiency, and a trace amount of CO and formic acid were produced therein.

According to the present invention, for instance, when the Pc-complex carried on the gas permeable member, in particular, electrode includes a central metal of a transition metal such as Co, Ni or Fe, oxygen atom is taken from $CO_2$ adsorbed on the gas permeable electrode to produce CO. When the Pc-complex carried on the gas permeable electrode includes a central metal of a base metal such as Zn, hydrogen is added to $CO_2$ adsorbed on the gas permeable electrode to produce formic acid. Also, when the Pc-complex carried on the gas permeable electrode includes a central metal such as Cu, the reduction is effected to disconnect oxygen from $CO_2$ adsorbed on the gas permeable electrode and to produce methane at the end.

EXAMPLE 4

Cobalt phthalocyanine, hydrophobic carbon black having an average particle size of approximately 420 Å and PTFE powder having an average particle size of approximately 0.3 μm were uniformly mixed with one another and then were processed into a reaction layer including fine hydrophilic and hydrophobic portions therein and having a dimension of 0.1 mm (thickness) × 100 mm (width) × 100 mm (height), and hydrophobic carbon black having an average particle size of approximately 420 Å and PTFE powder having an average particle size of approximately 0.3 μm were uniformly mixed with one another and then were processed into a gas permeable layer having a dimension of 0.4 mm (thickness) × 120 mm (width) × 120 mm (height). Then, the reaction layer and the gas permeable layer were bonded to each other to obtain a gas permeable electrode.

The obtained gas permeable electrode as an electrolytic reduction electrode (cathode) and a Pt net as an anode were mounted in an electrolytic cell containing 0.1 liter of 0.5M of $KHCO_3$ solution, and an ion-exchange membrane (Nafion 117 (trade name)) as a diaphragm for separating the electrolytic cell into cathode and anode compartments was provided in the electrolytic cell. While $CO_2$ gas was supplied to the rear surface of the gas permeable electrode at a flowing speed of 50 ml/min, an electrolytic reduction was carried out at an electrolytic potential of 1.4 to 1.45 V with respect to the SCE (saturated calomel electrode) and a current density of 80 mA/cm$^2$ for 10 minutes to obtain CO with 95 to 100% of current efficiency. In this instance, when the flowing speed of the $CO_2$ gas was increased, the production efficiency of CO could not be changed. At the flowing speed of 500 ml/min of the $CO_2$ gas, CO was produced with 100% of current efficiency. When CO was supplied to the rear surface of the gas permeable electrode at a flowing speed of 100 ml/min, only hydrogen gas was produced, and the CO was not reacted to find that the cobalt phthalocyanine has a superior selectivity.

EXAMPLE 5

Electrolytic reduction was effected in the same manner as Example 4, except using tin phthalocyanine instead of cobalt phthalocyanine, to obtain formic acid with 50 to 60% of current efficiency. When CO was supplied to the rear surface of the gas permeable electrode, no formic acid was produced. Therefore, it was found that the obtained product can be readily varied by changing the Pc-complex carried on the gas permeable electrode.

Comparative Example 3

0.5 liter of 0.5M of $KHCO_3$ solution was contained in an electrolytic cell, and a lead plate having a dimension of 0.1 mm (thickness)×100 mm (width)×100 mm (height) was used as an electrode in a conventional manner. While $CO_2$ gas was supplied into the $KHCO_3$ solution at a flowing speed of 200 ml/min, electrolytic reduction was carried out at an electrolytic potential of 1.4 to 1.45 V with respect to the SCE (saturated calomel electrode) and a current density of 4.8 mA/cm$^2$ for 60 minutes to obtain formic acid with 64.5% of current density.

Although the present invention has been described in its preferred embodiments with reference to the accompanying drawings, it is readily understood that the present invention is not restricted to the above described preferred embodiments, and various changes and modifications may be made in the present invention by those skilled in the art without departing from the spirit and scope of the present invention.

What is claimed is:

1. A gas permeable electrode, comprising:
a catalytic oxidation reduction reaction layer having particles of hydrophilic and hydrophobic carbon black, and a recrystallized Pc-complex, wherein only the hydrophilic carbon black particles support said recrystallized Pc-complex.

2. The electrode of claim 1, wherein the complex is soluble in sulfuric acid and recrystallizable by water, and is selected from the group consisting of phthalocyanine, diphthalocyanine and metal phthalocyanine complexes having a central metal selected from the group consisting of lead, chromium, iron, cobalt, nickel, copper, zinc, platinum, palladium, manganese, tin, and vanadium.

3. A gas permeable member, comprising: a catalytic oxidation reduction reaction layer having particles of hydrophilic and hydrophobic carbon black and being supported on the hydrophilic carbon black particles, a recrystallized complex selected from the group consisting of phthalocyanine, diphthalocyanine and metal phthalocyanine complexes having a central metal selected from the group consisting of lead, chromium, iron, cobalt, nickel, copper, zinc, platinum, palladium, manganese, tin, and vanadium.

4. The member of claim 3, wherein the complex is soluble in sulfuric acid and recrystallizable by water.

* * * * *